US011826900B2

United States Patent
Shimomura et al.

(10) Patent No.: US 11,826,900 B2
(45) Date of Patent: Nov. 28, 2023

(54) MANIPULATION DEVICE AND MANIPULATION SYSTEM

(71) Applicant: KAWASAKI JUKOGYO KABUSHIKI KAISHA, Kobe (JP)

(72) Inventors: Nobuyasu Shimomura, Kobe (JP); Masayuki Kamon, Akashi (JP); Hideyuki Ryu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 262 days.

(21) Appl. No.: 16/613,573

(22) PCT Filed: May 16, 2018

(86) PCT No.: PCT/JP2018/018921
§ 371 (c)(1),
(2) Date: Nov. 14, 2019

(87) PCT Pub. No.: WO2018/212235
PCT Pub. Date: Nov. 22, 2018

(65) Prior Publication Data
US 2021/0162603 A1 Jun. 3, 2021

(30) Foreign Application Priority Data
May 19, 2017 (JP) .................. 2017-100379

(51) Int. Cl.
*B25J 13/02* (2006.01)
*B25J 13/08* (2006.01)
(52) U.S. Cl.
CPC ........... *B25J 13/025* (2013.01); *B25J 13/087* (2013.01)

(58) Field of Classification Search
CPC .......... B25J 13/025; B25J 13/087; G06F 3/01
See application file for complete search history.

(56) References Cited

U.S. PATENT DOCUMENTS

| 5,347,204 A | * | 9/1994 | Gregory | ................ B64C 13/042 318/632 |
| 5,923,139 A | * | 7/1999 | Colgate | .................. B25J 9/1689 318/566 |

(Continued)

FOREIGN PATENT DOCUMENTS

| CN | 107921622 A | * | 4/2018 | ............. A61B 34/32 |
| CN | 209504165 U | * | 10/2019 | |

(Continued)

OTHER PUBLICATIONS

"Tele-presence: visual, audio and tactile feedback and control of a twin armed mobile robot;" Caldwell, D.G. ; Wardle, A. ; Goodwin, M.; Proceedings of the 1994 IEEE International Conference on Robotics and Automation (pp. 244-249 vol. 1); Jan. 1, 1994. (Year: 1994).*

(Continued)

*Primary Examiner* — Khoi H Tran
*Assistant Examiner* — Jorge O Peche
(74) *Attorney, Agent, or Firm* — Oliff PLC

(57) ABSTRACT

A manipulation device and a manipulation system of a simpler configuration. A manipulation device includes an input part configured to receive an input of an operational instruction by an operator in order to operate a manipulating target, and a speaker configured to receive a signal based on vibration detected at the manipulating target and generate vibration based on the received signal. The vibration generated by the speaker is transmitted to the operator through at least a part of the input part.

5 Claims, 9 Drawing Sheets

(56) References Cited

U.S. PATENT DOCUMENTS

| | | | |
|---|---|---|---|
| 6,104,382 A * | 8/2000 | Martin | A63F 13/24 345/161 |
| 6,339,969 B1 * | 1/2002 | Salcudean | B25J 9/106 901/15 |
| 6,379,393 B1 * | 4/2002 | Mavroidis | A61F 2/582 623/57 |
| 6,429,849 B1 * | 8/2002 | An | G05G 25/04 345/161 |
| 6,531,998 B1 * | 3/2003 | Gordon | G05G 9/047 363/21.01 |
| 6,723,106 B1 * | 4/2004 | Charles | B25J 9/1065 606/130 |
| 7,243,746 B1 * | 7/2007 | Vasant | B62D 11/04 180/21 |
| 8,602,456 B2 * | 12/2013 | Bosscher | F16C 11/0619 285/261 |
| 9,333,039 B2 * | 5/2016 | Kuchenbecker | A61B 34/76 |
| 10,198,086 B2 * | 2/2019 | Parazynski | G06F 3/038 |
| 10,324,487 B2 * | 6/2019 | Parazynski | G05G 5/03 |
| 10,331,233 B2 * | 6/2019 | Parazynski | G06F 3/0346 |
| 10,520,973 B2 * | 12/2019 | Parazynski | G05G 1/01 |
| 10,664,002 B2 * | 5/2020 | Parazynski | G05G 1/01 |
| 10,730,549 B2 * | 8/2020 | Takenaka | B62D 6/02 |
| 11,083,967 B1 * | 8/2021 | Summit | A63F 13/285 |
| 2001/0004608 A1 | 6/2001 | Cheng | |
| 2002/0004423 A1 * | 1/2002 | Minami | A63F 13/577 463/38 |
| 2002/0110246 A1 * | 8/2002 | Gosior | A63F 13/28 381/2 |
| 2003/0040758 A1 * | 2/2003 | Wang | A61B 34/70 606/130 |
| 2003/0125716 A1 * | 7/2003 | Wang | B25J 9/1689 606/1 |
| 2004/0059191 A1 * | 3/2004 | Krupa | A61M 25/0136 600/146 |
| 2004/0193016 A1 * | 9/2004 | Root | A61B 1/0052 600/146 |
| 2006/0066574 A1 * | 3/2006 | Kim | G06F 3/0346 345/161 |
| 2006/0142657 A1 * | 6/2006 | Quaid | A61B 90/37 600/424 |
| 2007/0144799 A1 * | 6/2007 | Vasant | B62D 31/003 180/65.1 |
| 2007/0182708 A1 * | 8/2007 | Poupyrev | G06F 3/016 345/156 |
| 2007/0289657 A1 * | 12/2007 | Gunson | E02D 29/02 141/5 |
| 2008/0111791 A1 * | 5/2008 | Nikittin | G06F 3/0395 345/163 |
| 2008/0207289 A1 * | 8/2008 | Kang | A63B 21/4047 463/7 |
| 2008/0255704 A1 * | 10/2008 | Braut | H01H 3/0253 901/42 |
| 2008/0300055 A1 * | 12/2008 | Lutnick | G06V 40/107 463/39 |
| 2009/0069081 A1 * | 3/2009 | Thorner | G06F 3/016 463/30 |
| 2009/0102620 A1 * | 4/2009 | Kato | G06F 3/011 340/407.1 |
| 2010/0302017 A1 * | 12/2010 | Guglielmo | B66F 11/04 345/161 |
| 2012/0294696 A1 * | 11/2012 | Summer | B25J 9/1689 700/264 |
| 2013/0082829 A1 * | 4/2013 | Seki | G06F 3/016 340/407.1 |
| 2014/0098968 A1 | 4/2014 | Furuta | |
| 2014/0132082 A1 * | 5/2014 | McGinn | G05D 1/0061 307/125 |
| 2014/0200432 A1 * | 7/2014 | Banerji | G16H 20/30 607/54 |
| 2014/0214206 A1 * | 7/2014 | Steinberg | B25J 13/025 700/258 |
| 2015/0133221 A1 * | 5/2015 | Danny | A63F 13/92 345/184 |
| 2015/0355712 A1 * | 12/2015 | Rihn | A63F 13/285 340/407.2 |
| 2016/0031078 A1 * | 2/2016 | Kapoor | B25J 9/0081 700/258 |
| 2016/0175711 A1 * | 6/2016 | Billington | G08B 6/00 340/407.2 |
| 2016/0179128 A1 * | 6/2016 | Guglielmo | B66F 11/04 182/19 |
| 2017/0220112 A1 * | 8/2017 | Nakamura | B06B 1/0611 |
| 2017/0322629 A1 * | 11/2017 | Pirasmepulkul | G06F 3/0346 |
| 2017/0354876 A1 * | 12/2017 | Rihn | A63F 13/285 |
| 2018/0071047 A1 | 3/2018 | Suzuki et al. | |
| 2018/0168756 A1 * | 6/2018 | Liao | A61B 34/70 |
| 2018/0243036 A1 * | 8/2018 | Donlon | A61B 34/71 |
| 2018/0243897 A1 * | 8/2018 | Hashimoto | B25J 9/1602 |
| 2018/0243919 A1 | 8/2018 | Hashimoto et al. | |
| 2018/0297211 A1 * | 10/2018 | Schaible | B25J 13/025 |
| 2018/0368656 A1 * | 12/2018 | Austin | A61B 1/045 |
| 2019/0015166 A1 * | 1/2019 | Mahoney | A61B 17/32056 |
| 2020/0107898 A1 * | 4/2020 | Kim | A61B 34/71 |
| 2020/0117212 A1 * | 4/2020 | Tian | G06F 3/016 |
| 2020/0117213 A1 * | 4/2020 | Tian | G05D 1/0274 |
| 2020/0117898 A1 * | 4/2020 | Tian | G06F 3/04815 |
| 2020/0253677 A1 * | 8/2020 | Jinno | A61B 34/71 |
| 2021/0059780 A1 * | 3/2021 | Sutherland | A61B 34/74 |
| 2021/0162603 A1 * | 6/2021 | Shimomura | G06F 3/01 |
| 2023/0165649 A1 * | 6/2023 | Fitzsimons | A61B 34/20 700/245 |
| 2023/0271589 A1 * | 8/2023 | Pham | G06F 3/0484 701/2 |

FOREIGN PATENT DOCUMENTS

| | | | | |
|---|---|---|---|---|
| CN | 114760903 A | * | 7/2022 | A61B 1/00009 |
| DE | 10392966 T5 | * | 8/2005 | G05G 7/02 |
| DE | 102014105538 A1 | * | 10/2015 | B25J 13/025 |
| EP | 1629949 A2 | * | 3/2006 | B25J 13/025 |
| EP | 1684159 A2 | * | 7/2006 | B25J 13/02 |
| EP | 1629949 B1 | * | 10/2010 | B25J 13/025 |
| EP | 2463533 A1 | * | 6/2012 | F16C 11/0604 |
| EP | 2870985 A2 | * | 5/2015 | A63F 13/00 |
| EP | 2709802 B1 | * | 8/2020 | B25J 9/1689 |
| ES | 2877800 T3 | * | 11/2021 | A61B 34/10 |
| GB | 2228783 A | * | 9/1990 | B25J 13/02 |
| JP | H02-262993 A | | 10/1990 | |
| JP | 09123078 A | | 5/1997 | |
| JP | 2000340072 A | * | 12/2000 | |
| JP | 3078355 U | | 7/2001 | |
| JP | 2005533326 A | * | 11/2005 | |
| JP | 2009-090421 A | | 4/2009 | |
| JP | 2010-146307 A | | 7/2010 | |
| JP | 2011230231 A | * | 11/2011 | B25J 9/1633 |
| JP | 2013080327 A | * | 5/2013 | G05G 9/047 |
| JP | 2016-214715 A | | 12/2016 | |
| KR | 20030043023 A | * | 6/2003 | |
| KR | 200320700 Y1 | * | 7/2003 | |
| KR | 100681768 B1 | * | 4/2005 | |
| KR | 101435189 B1 | * | 9/2014 | |
| KR | 20150123315 A | * | 11/2015 | |
| TW | 201707895 A | * | 3/2017 | A61B 34/32 |
| WO | WO-9510080 A1 | * | 4/1995 | B25J 13/02 |
| WO | WO-2004104814 A1 | * | 12/2004 | G05G 7/02 |
| WO | WO-2006091494 A1 | * | 8/2006 | A61B 17/1675 |
| WO | WO-2007136771 A2 | * | 11/2007 | A61B 17/1764 |
| WO | WO-2012018136 A1 | * | 2/2012 | G02B 21/32 |
| WO | 2013/065088 A1 | | 5/2013 | |
| WO | WO-2014116126 A1 | * | 7/2014 | G05G 9/04737 |
| WO | 2016/126522 A1 | | 8/2016 | |
| WO | 2017/033362 A1 | | 3/2017 | |
| WO | WO 2017-033380 | * | 3/2017 | |
| WO | WO-2018092595 A1 | * | 5/2018 | G06F 3/01 |

(56) References Cited

FOREIGN PATENT DOCUMENTS

| WO | WO-2018176131 A1 | * | 10/2018 | ............ B25J 13/025 |
| WO | WO-2020040999 A1 | * | 2/2020 | ............... G01D 5/16 |

OTHER PUBLICATIONS

"User-interface for teleoperation with mixed-signal haptic feedback;" Daniel B. Thiem, Carsten Neupert, Johannes Bilz, Sebastian Matich; 2017 IEEE/RSJ International Conference on Intelligent Robots and Systems (IROS) (pp. 892-898); Sep. 1, 2017. (Year: 2017).*

* cited by examiner

MANIPULATION DEVICE AND MANIPULATION SYSTEM

TECHNICAL FIELD

The present disclosure relates to a manipulation device and a manipulation system which transmit to an operator vibration which acts on a manipulating target.

BACKGROUND ART

Conventionally, a system which generates vibration at an input device on an operator's end based on vibration which acted on a robot, and transmits to the operator the vibration which acted on the robot is proposed. Thus, a system which transmits to the operator of the robot the vibration which acted on the robot by generating the vibration on the operator's end is disclosed in Patent Document 1. In Patent Document 1, a vibration presenting part includes a speaker and a vibrating element. A case in which vibration which acted on the robot is transmitted to the operator through the speaker by audio, and a case in which vibration which acted on the robot is transmitted to the operator through the vibrating element by vibration, are disclosed.

REFERENCE DOCUMENT OF CONVENTIONAL ART

Patent Document

[Patent Document 1] JP2016-214715A

DESCRIPTION OF THE DISCLOSURE

Problems to be Solved by the Disclosure

However, according to the system disclosed in Patent Document 1, it is thought that vibration which acted on the robot is transmitted to the operator by using the speaker or vibrating element of a configuration different from a part where the manipulation of the robot is performed. Therefore, the configuration for transmitting the sound or vibration to the operator is required separately from the part where the manipulation is performed. Thus, the configuration of the device may become complicated, and thereby increasing the manipulation device in the size.

Therefore, the present disclosure is made in view of the above situations, and one purpose thereof is to provide a manipulation device and a manipulation system of a simpler configuration.

Summary of the Disclosure

According to one aspect of the present disclosure, a manipulation device includes an input part configured to receive an input of an operational instruction by an operator in order to operate a manipulating target, and a vibrating element configured to receive a signal based on vibration detected at the manipulating target and generate vibration based on the received signal. The vibration generated by the vibrating element is transmitted to the operator through at least a part of the input part.

According to this configuration of the manipulation device, since the vibration generated by the vibrating element is transmitted to the operator through the input part, the input part can serve as a transmitting part of the vibration to the operator, thus the configuration can be simpler.

The input part may include a grip part configured to be gripped by the operator when the operational instruction is inputted, and an arm part movably supporting the grip part. The arm part may be provided at a position between the grip part and the vibrating element. The vibration generated by the vibrating element may be transmitted to the operator through the arm part and the grip part.

Since the vibration generated by the vibrating element is transmitted to the operator through the arm part and the grip part, the vibration received by the arm part can be transmitted to the operator certainly.

The input part may include a grip part configured to be gripped by the operator when the operational instruction is inputted, and the vibrating element may be attached to the grip part.

Since the vibrating element is attached to the grip part, the vibration generated by the vibrating element can be transmitted to the grip part directly. Therefore, the vibration can be transmitted to the operator certainly.

The input part may include a grip body having two grip parts.

The vibrating element may be a speaker.

The vibrating element may be a transducer.

The vibrating element may be a first motor.

The vibrating element may be a second motor configured to after the grip part is moved, cause torque for moving the arm part so that the grip part is returned to a given position, to act on the arm part, present a force sense to the operator, or support the grip part and the arm part.

According to another aspect of the present disclosure, a manipulation system includes a manipulating target having a sensor part configured to detect vibration and transmit a signal based on the detected vibration, and a manipulation device having an input part configured to receive an input of an operational instruction by an operator in order to operate the manipulating target, and a vibrating element configured to receive a signal from the sensor part and generate vibration based on the received signal. The vibration generated by the vibrating element is transmitted to the operator through at least a part of the input part.

According to this configuration of the manipulation system, since the vibration generated by the vibration element is transmitted to the operator through the input part, the input part can serve as a transmitting part of the vibration to the operator, thus the configuration can be simpler.

The manipulation system may include a controller configured to receive the signal from the sensor part and transmit the received signal to the vibrating element. The controller may have a filter configured to pass only a particular frequency band of the signal transmitted from the sensor part.

Since the filter passes only the particular frequency band of the signal transmitted from the sensor part, an unnecessary portion of the signal can be removed and only a necessary portion of the signal can be transmitted to the operator. Therefore, the information on the manipulating target can be transmitted to the operator certainly.

The particular frequency band may be a frequency band exceeding a threshold of a sound pressure level.

Effect of the Disclosure

According to the present disclosure, since the manipulation device which transmits to the operator the vibration which acts on the manipulating target can be made the simpler configuration, the manipulation device can be reduced in the size.

MODES FOR CARRYING OUT THE DISCLOSURE

Hereinafter, a manipulation device and a manipulation system according to embodiments of the present disclosure will be described with reference to the accompanying drawings.

First Embodiment

Figure 1:
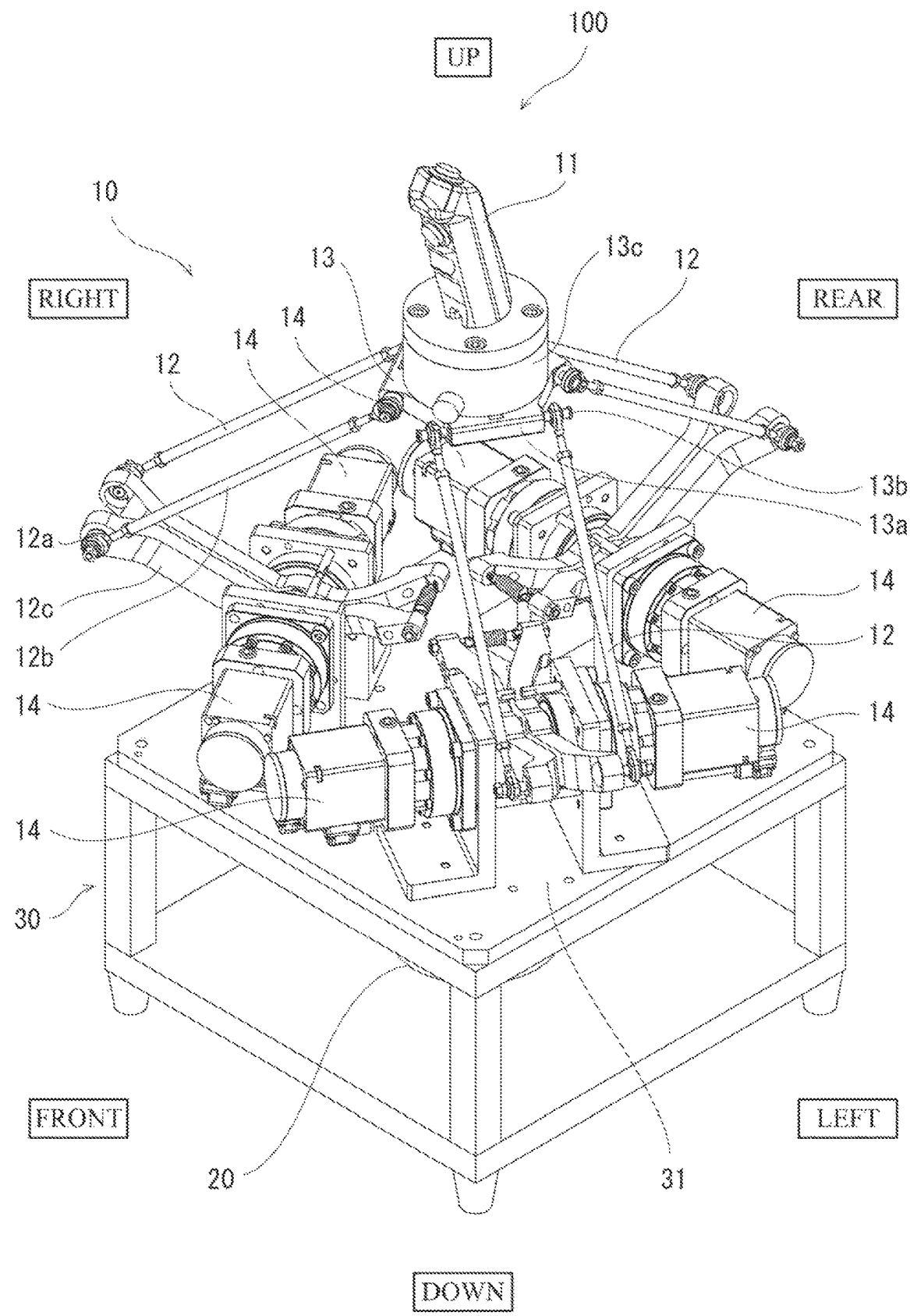
FIG. 1 is a perspective view of a manipulation device according to a first embodiment of the present disclosure.

FIG. 1 is a perspective view illustrating a manipulation device 100 according to a first embodiment of the present disclosure. The manipulation device 100 includes an input part 10 into which an operational instruction is inputted by an operator in order to operate a manipulating target, a speaker (vibrating element) 20 which receives a signal based on vibration detected at the manipulating target, and generates vibration based on the received signal, and a support table 30 which supports the input part 10 and the speaker 20.

Figure 2:
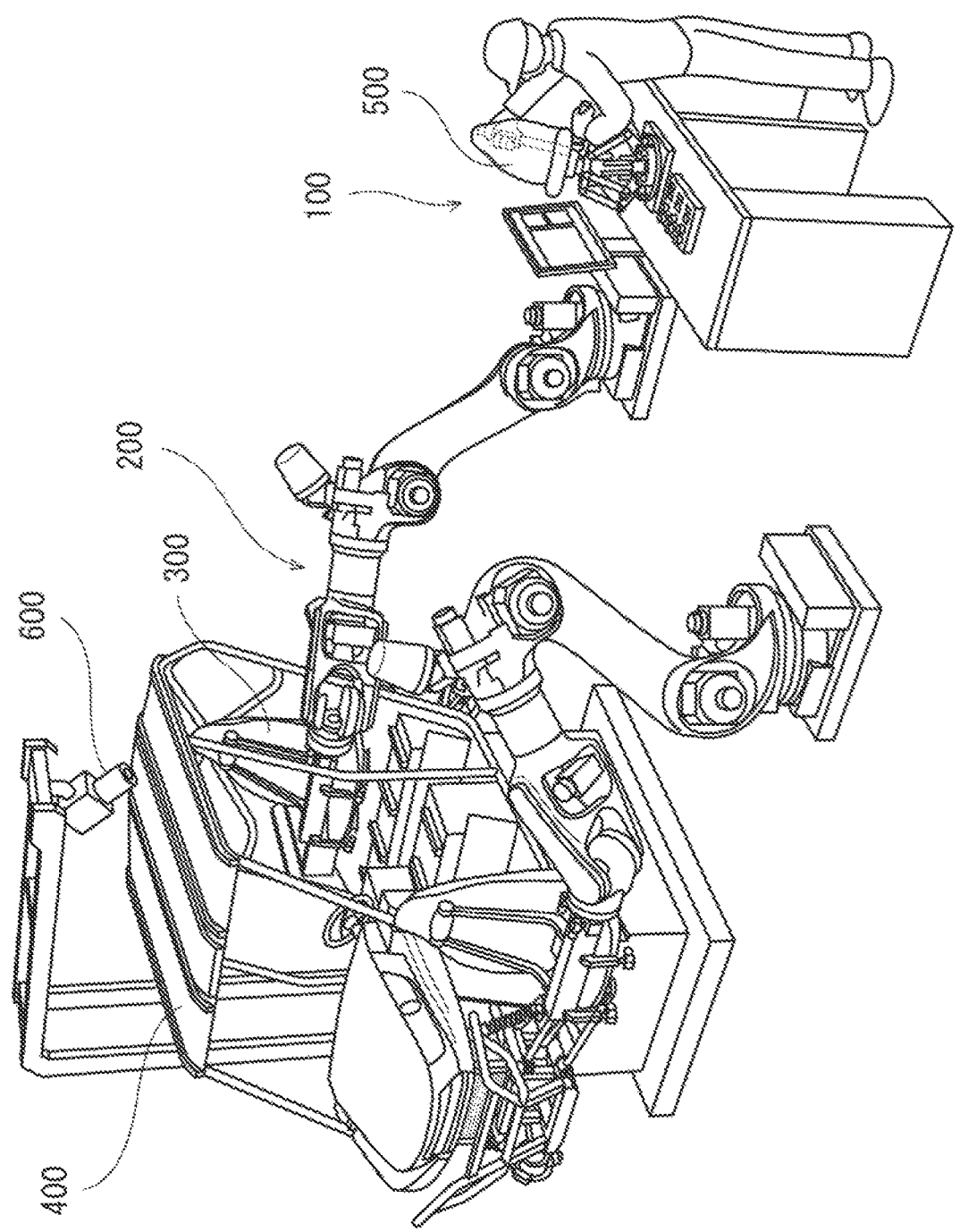
FIG. 2 is a perspective view illustrating a state where an operator operates a robot by using the manipulation device of FIG. 1.

In this embodiment, the manipulating target to be operated with the manipulation device 100 is a robot. A configuration view illustrating the robot 200 to be manipulated is illustrated in FIG. 2. Here, for example, a configuration in which the robot 200 holds a seat 300, and the robot 200 attaches the seat 300 to a cart 400 is described.

The robot 200 as the manipulating target has a robotic arm. A plurality of links are connected to form the robotic arm. In the robotic arm, a joint is formed between the links. Moreover, the robotic arm is provided with servo motors corresponding to the respective joints.

The robot 200 is configured to be holdable of the seat 300. The robot 200 holds the seat 300, moves the arm of the robot 200 to bring the seat 300 closer to the cart 400, and attaches the held seat 300 to the cart 400. In that case, the operator operates the manipulation device 100 to operate the robot 200 and attach the seat 300 to the cart 400.

Moreover, as illustrated in FIG. 2, the robot 200 moves the robotic arm to move the seat 300 held by the robot 200. Thus, the seat 300 is brought close to the cart 400, and as a result, the seat 300 is brought in contact with an attaching position of the cart 400. In this way, the seat 300 is attached to the cart 400.

In FIG. 2, since the robot 200 holds the seat 300 and attaches the held seat 300 to the cart 400, an adapter 500 having the shape of the seat 300 is attached to the manipulation device 100 in order to facilitate the attaching work of the seat 300. Since the adapter 500 having the shape of the seat 300 is attached to the manipulation device 100, the operator can operate the robot 200 by operating the adapter 500 having the shape of the seat 300. Therefore, the operator can operate the robot 200 by performing an operation of actually attaching the seat 300 to the cart 400, and the operator can operate the robot 200 easily and naturally.

Moreover, as illustrated in FIG. 2, a camera 600 is attached above an operating range of the robot 200. While the robot 200 performs the work, the robot 200 and its surroundings can be imaged by the camera 600. Thus, the operator can perform the manipulation, while looking at the robot 200 and its surroundings through an image captured by the camera 600. When manipulating the robot 200, the robot 200 may be remotely manipulated, without confirming the operation of the robot 200 by naked eyes. Thus, when remotely manipulating the robot 200, the operator may cause the robot 200 to perform the work, while the operator looks at the image captured by the camera and confirming the robot 200 and its surroundings.

Next, a configuration of the manipulation device 100 is described.

The input part 10 includes a grip part 11 gripped by the operator when the operational instruction is inputted, arm parts 12 which movably support the grip part 11, and motors 14.

The grip part 11 is formed in order for the operator to grip easily so that the operator can grip and hold the grip part 11. In a state where the operator grips and holds the grip part 11, the operator moves the grip part 11 to move the robot 200, thereby operating the robot 200.

The grip part 11 is supported by the support part 13. Moreover, the grip part 11 is connected with the support part 13 through a cylindrical connecting part 13c. The support part 13 is movably supported by the arm part 12. The arm part 12 is connected to the motor 14. Moreover, the arm part 12 is provided at a position between the grip part 11 and the speaker 20.

Each arm part 12 has a joint 12a, and is formed so as to be bendable centering on the joint 12a. Therefore, in the arm part 12, a grip-part-side arm part 12b and a motor-side arm part 12c are bendably connected to each other through the joint 12a.

Moreover, the input part 10 is provided with the motor 14. The motor 14 is supported by the support table 30. After the grip part 11 is moved, the motor 14 causes torque for moving the arm part 12 so that the grip part 11 returns to a given position, to act on the arm part 12. Six motors 14 are provided in this embodiment. The six motors 14 are arranged in a triangular shape on the support table 30, and two motors 14 constitute one side of the triangle. Moreover, an encoder is disposed at a position coaxial with each motor. Six encoders are arranged corresponding to the six arm parts 12 so that each encoder is detectable of a displacement of a rotation shaft of the arm part 12.

Moreover, one arm part 12 is provided per motor 14. In this embodiment, since the six motors 14 are provided to the manipulation device 100, the six arm parts 12 are provided to the manipulation device 100.

In this embodiment, the six motors 14 are arranged in a triangular shape on the support table 30, and the two motors 14 constitute one side of the triangle. The two motors 14 which constitute one side among the six motors 14 arranged in the triangular shape are each provided with one arm part 12 (a total of two). Therefore, the two motors 14 which constitute one side among the six motors 14 which form the triangle are provided with the two arm parts 12.

One side 13a of three sides surrounding the support part 13 is sandwiched by the arm parts 12 provided to the two motors 14 which constitute one side of the triangle formed by the six motors 14. A shaft 13b is disposed so as to pass through the inside of the support part 13 at the side 13a of the support part 13. The shaft 13b is held rotatably at both ends by the two grip-part-side arm parts 12b which sandwiches the side 13a. Therefore, the support part 13 is supported rotatably centering on the shaft 13b.

Note that, the shaft 13b is held at the both ends by the two grip-part-side arm parts 12b. The grip-part-side arm part 12b holds the shaft 13b rotatably on three axes which are perpendicular to each other and include a center axis of the shaft 13b. Therefore, the support part 13 is supported rotatably on the three axes which are perpendicular to each other and include the center axis of the shaft 13b. Thus, the support part 13 is supported by the two grip-part-side arm parts 12b so as to be rotatable on the three axes which are perpendicular to each other and include the center axis of the shaft 13b.

The configuration of the side 13a and the shaft 13b of the support part 13 is similar, for all the three sides of the support part 13.

Figure 3:
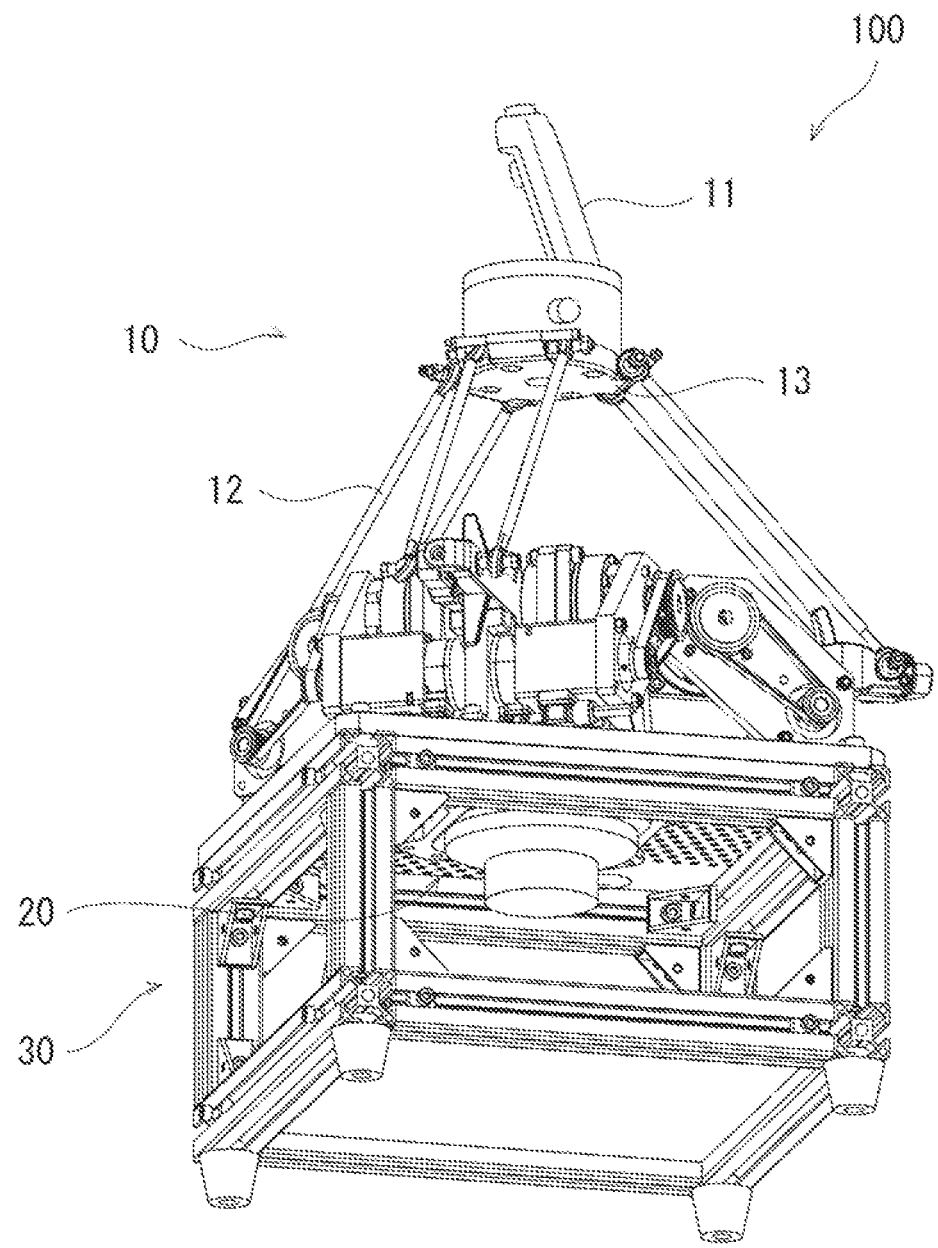
FIG. 3 is a perspective view illustrating the manipulation device of FIG. 1, seen from obliquely downward.
Figure 4:
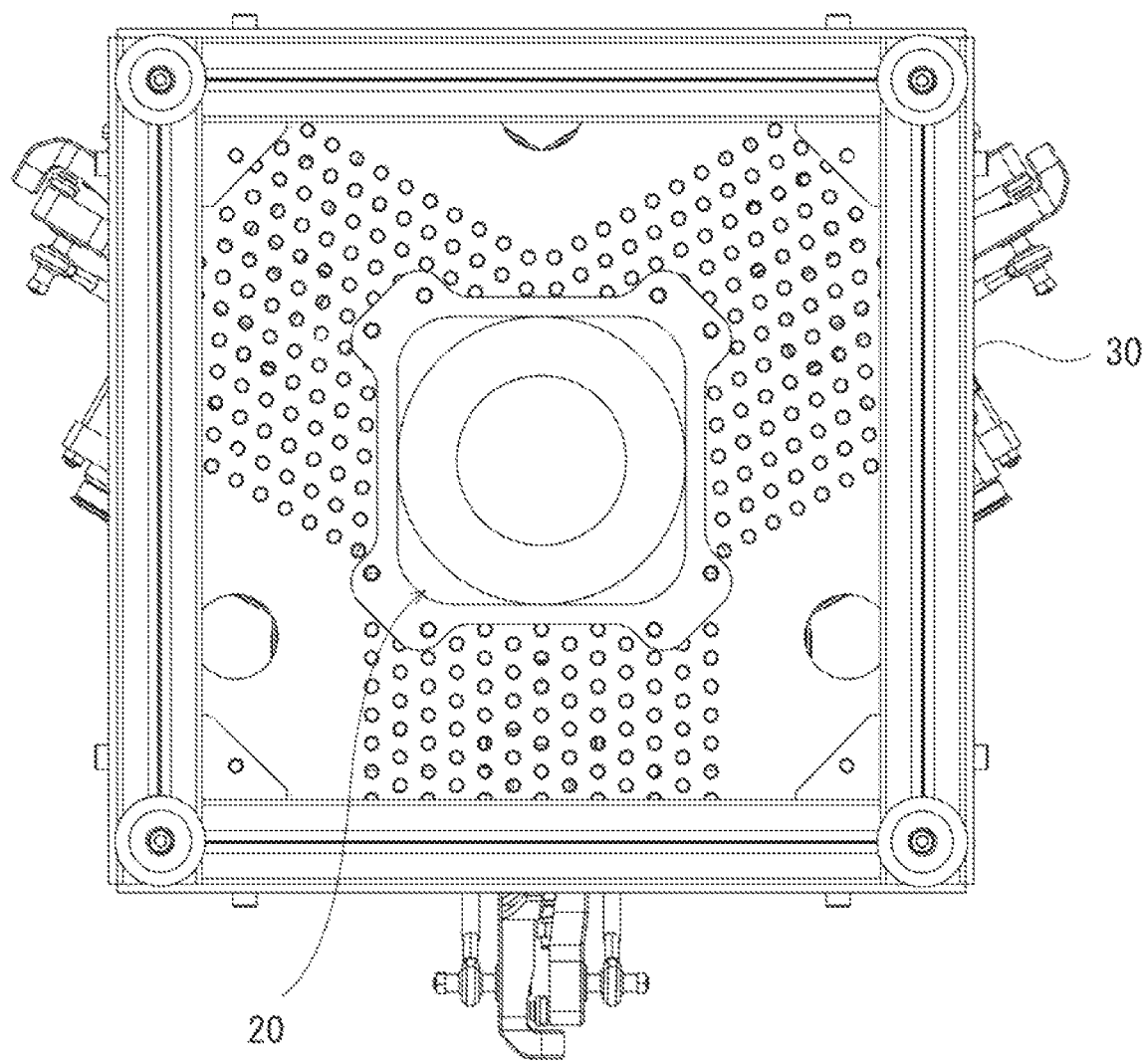
FIG. 4 is a plan view illustrating a part of the manipulation device of FIG. 1 to which a speaker is attached, seen from below.

The speaker 20 is attached to a position of a supporting plate 31 of the support table 30, on the opposite side from the surface to which the input part 10 is attached. A perspective view of the manipulation device 100, seen from a position of obliquely downward, is illustrated in FIG. 3. Moreover, a plan view of the manipulation device 100, seen from below, is illustrated in FIG. 4.

When the speaker 20 generates vibration, vibration can be generated in the manipulation device 100. In this embodiment, the speaker 20 functions as a vibrating element which generates the vibration.

Figure 5:
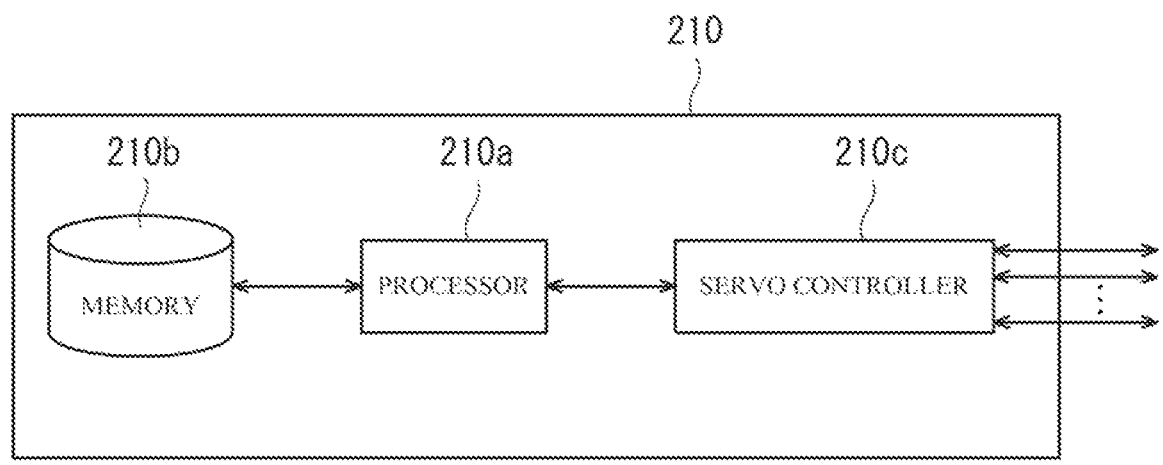
FIG. 5 is a block diagram illustrating a configuration of a control system of the robot of FIG. 2.

Next, a controller 210 which controls operation of the robot 200 is described. FIG. 5 is a block diagram roughly illustrating one example of a configuration of a control system of the robot 200.

As illustrated in FIG. 5, the controller 210 includes a processor 210a, a memory 210b, and a servo controller 210c.

The controller 210 is a robot controller provided with, for example, a computer, such as a microcontroller. Note that the controller 210 may be comprised of a sole controller 210 which carries out a centralized control, or may be comprised of a plurality of controllers 210 which collaboratively carry out a distributed control.

The memory 210b stores information on a basic program as the robot controller, various fixed data, etc. The processor 210a controls various operations of the robot 200 by reading and executing software, such as the basic program, stored in the memory 210b. That is, the processor 210a generates a control command of the robot 200 and outputs it to the servo controller 210c.

The servo controller 210c is configured to control the drive of the servo motors corresponding to the respective joints of the robotic arm of the robot 200 based on the control command generated by the processor 210a.

Figure 6:
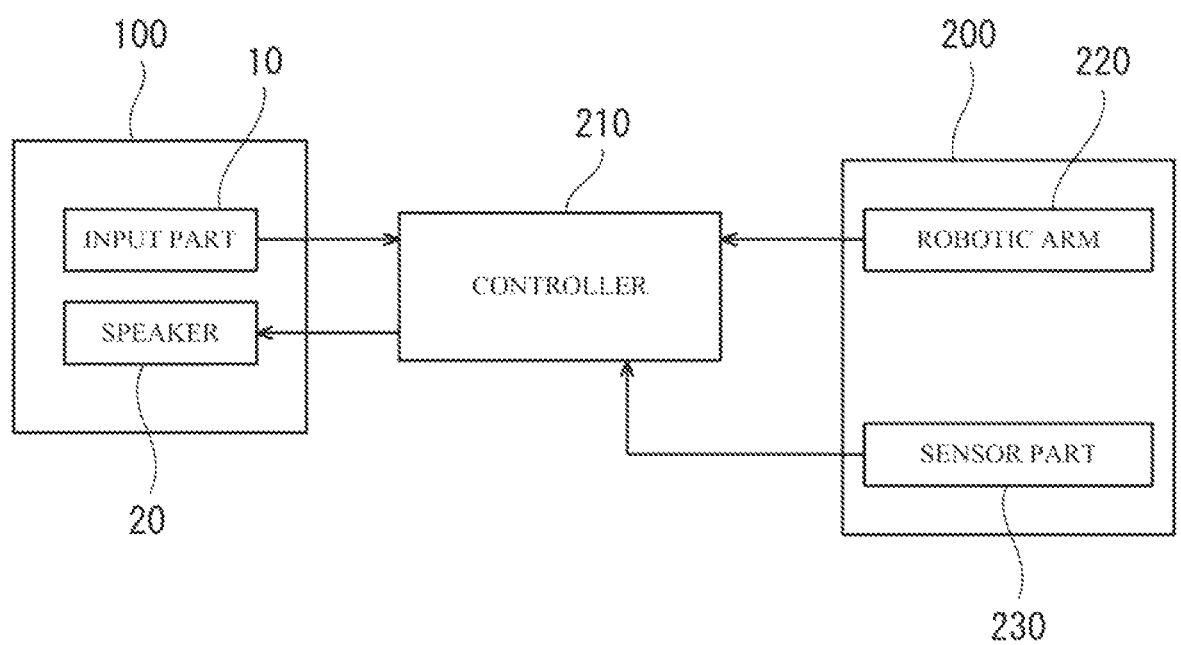
FIG. 6 is a block diagram illustrating a configuration of the control system of the manipulation system for operating the robot by using the manipulation device of FIG. 2.

Next, a control system of a robot system for operating the robot 200 by using the manipulation device 100 is described. FIG. 6 is a block diagram roughly illustrating one example of a configuration of the control system of the robot system for operating the robot 200 by using the manipulation device 100.

The controller 210 receives a signal of the operational instruction for operating the robot 200 inputted from the manipulation device 100.

The controller 210 controls the robotic arm 220 to operate based on the input signal received from the manipulation device 100.

The controller 210 receives an input signal transmitted from a sensor part 230. The sensor part 230 detects vibration and transmits a signal based on the detected vibration to the controller 210. The controller 210 receives the signal transmitted from the sensor part 230.

Moreover, the controller 210 transmits to the speaker 20 a signal based on the signal received from the sensor part 230. The speaker 20 generates vibration by the speaker 20 based on the received signal. Thus, the vibration based on the vibration detected by the sensor part 230 is transmitted to the operator of the manipulation device 100.

Moreover, the controller 210 may also receive other signals. For example, other sensors (not illustrated) may be provided to the robot 200 and signals from other sensors may be received. Moreover, the controller 210 may also transmit other signals.

Next, operation when operating the robot 200 by the manipulation device 100 is described. When operating the robot 200 by the manipulation device 100, the operator grips the grip part 11 in the input part 10 of the manipulation device 100. The operator moves the grip part 11 in a desired direction for moving the robot, while gripping the grip part 11.

When the operator moves the grip part 11, the support part 13 which supports the grip part 11 moves along with the movement of the grip part 11. In addition, by the movement of the support part 13, the grip-part-side arms parts 12b connected to the support part 13 move, and the arm parts 12 move.

When the arm parts 12 move, the rotation shafts of the encoders are rotated accordingly. Here, the displacements of the rotation shafts are detected by the respective encoders. Therefore, the signals according to the displacements of the rotation shafts are generated. The signals according to the input by the operator through the grip part 11 can be generated, and can be transmitted to the controller 210. Thus, the input part 10 is provided with the encoders which detect the displacements of the rotation shafts according to the position and the posture of the grip part 11.

After inputting the movement of the robotic arms of the robot 200 by moving the grip part 11, the grip part 11 returns to a given original position. In this embodiment, the arm parts 12 are moved to the given original position by causing the motors 14 to act the torques on the arm parts 12. Thus, the motors 14 cause the torques, for moving the arm parts 12 so that the grip part 11 is returned to the original position, to act on the arm parts 12, after the grip part 11 is moved.

Moreover, the motors 14 have a function to present the operator a force sense when the operator operates the manipulating target. While the operator operates the manipulating target, if the manipulating target contacts an object, the operator can sense the force by giving resistance to the operator by the motors 14. Therefore, information on the manipulating target can be sensed more certainly. Moreover, when a load is applied to the manipulating target, the motors 14 can present the operator the force according to the load. Moreover, the motors 14 have a function to support the grip part 11 and the arm parts 12. Since the motors 14 support the grip part 11 and the arm parts 12, the grip part 11 and the arm parts 12 can be located at a given position.

Particularly, in this embodiment, the support part 13 is configured to be rotatable centering on the shafts 13*b* provided to the three sides, respectively, and is configured to be supported by the two grip-part-side arm parts 12*b* so as to be rotatable on the three axes which are perpendicular to each other and include the center axis of the shaft 13*b*. Therefore, the support part 13 is configured to be able to lean by leaning the grip part 11. Thus, since the grip part 11 can change its posture by being inclined, the robot 200 can be operated so that the posture of the robot 200 is changed.

Next, operation of the robot 200 and the manipulation device 100 when vibration occurs at the robot 200 end is described.

When vibration occurs at the robot 200 end, the vibration is detected by the sensor part 230 attached to the robot 200. For example, the sensor part 230 is attached to a tip-end part of the robotic arm of the robot 200 illustrated in FIG. 2. In this embodiment, a sound concentrating microphone is used as the sensor part 230. Alternatively, a sound concentrating microphone with an amplifier which is a sound concentrating microphone to which the amplifier is attached, may be used as the sensor part.

Note that the sensor part 230 is not limited to the configuration attached to the tip-end part of the robotic arm. The sensor part may be attached to other positions of the robot 200. The sensor part 230 may be attached to any position, as long as it can detect vibration when the vibration acts on the robot 200.

When vibration which acted on the robot 200 is detected by the sensor part 230 attached to the robot 200, a signal based on the vibration detected by the sensor part 230 is generated, and the generated signal is transmitted to the controller 210. When the controller 210 receives the signal from the sensor part 230, it performs amplification, filtering, etc. of the signal and transmits the signal to the speaker 20. When the signal is transmitted to the speaker 20, the speaker 20 generates vibration according to the signal. At this time, the speaker 20 functions as a vibrating element which generates the vibration.

Here, since the speaker 20 is attached to the position of the supporting plate 31 of the support table 30 opposite from the surface to which the input part 10 is attached, the vibration generated by the speaker 20 is directly transmitted to a hand of the operator which grips the grip part 11 of the robot 200 through the input part 10. That is, the vibration generated by the speaker 20 is directly transmitted to the operator who grips the grip part 11, through the support table 30, the motors 14, the arm parts 12, the support part 13, and the grip part 11.

Since the vibration generated by the speaker 20 is directly transmitted to the operator who grips the grip part 11, the operator can certainly recognize that the vibration occurs at the robot 200 when the vibration acts on the robot 200. For example, it can be prevented that energy of the vibration is spread to other positions, and vibration to be transmitted to the operator is reduced due to the vibration transmitted to the operator being transmitted through many configurations other than the manipulation device 100. Thus, it can be prevented that the operator continues the work while he/she does not notice the vibration. In this embodiment, since the vibration generated by the speaker 20 is directly transmitted to the operator through the configuration of the manipulation device 100, the operator can certainly sense the vibration. Thus, since the vibration occurred at the robot 200 can be recognized more certainly, the information on the robot 200 can be recognized more certainly.

For example, when the robot 200 collides the cart 400, vibration caused by this contact between the robot 200 and the cart 400 is transmitted to the operator who grips the grip part 11 of the manipulation device 100. Therefore, the operator who grips the grip part 11 of the manipulation device 100 can certainly recognize that the robot 200 contacted the cart 400.

The vibration transmitted to the operator may be those detected by the operator's tactile sense or may be those detected by the operator's hearing. That is, the vibration may be those transmitted to the operator through the operator's sense, or may be those transmitted to the operator through audio.

Moreover, in this embodiment, a part of the input part 10 is disposed between the speaker 20 and the grip part 11 gripped by the operator. Therefore, vibration generated by the speaker 20 is transmitted to the operator through at least a part of the input part10. Since the vibration is transmitted to the operator who grips the grip part 11 through a part of the input part 10 of the manipulation device 100, it is not necessary to newly provide a configuration for transmitting the vibration to the operator. Therefore, the configuration of the manipulation device 100 can be simplified. The manipulation device 100 can be reduced in the size by simplifying the configuration of the manipulation device 100. Moreover, the manufacturing cost of the manipulation device 100 can be kept low.

In this embodiment, the input part 10 of the manipulation device 100 is provided with the arm parts 12 which movably support the grip part 11. Since the arm parts 12 are provided at the position between the grip part 11 and the speaker 20, the vibration generated by the speaker 20 is transmitted to the operator through the arm parts 12 and the grip part 11.

In this embodiment, each arm part 12 is formed in a narrow and long pipe shape. Moreover, in the arm part 12, the motor-side arm part 12*c* connected to the motor 14 at a position directly below the grip part 11 disposed at the center is disposed radially outward of the motor 14, and the grip-part-side arm part 12*b* is disposed so as to extend toward the grip part 11 via the joint 12*a*. Therefore, the arm part 12 has the shape which is easy to gather vibration when the vibration occurs at the speaker 20. Thus, the vibration is easy to be transmitted to the grip part 11 through the arm part 12. As a result, the vibration generated by the speaker 20 can be transmitted to the operator more certainly.

Moreover, in this embodiment, the six motors 14 are disposed on the support table 30, and the six arm parts 12 are attached to the motors 14 corresponding to the motors 14. In this embodiment, the six arm parts 12 are arranged so as to be divided into three sets of two aim parts 12. The three sets of arm parts 12 are disposed on the support table 30 at about 120° interval. Therefore, the three sets of arm parts 12 are arranged so as to equally surround the perimeter of the grip part 11. By arranging the arm parts 12 in this way, the arm parts 12 have the shape which is easier to gather the vibration emitted from the speaker 20. Therefore, the vibration generated by the speaker 20 can be transmitted to the operator more certainly.

Note that, the speaker 20 may be provided with an amplifier which amplifies the signal transmitted to the speaker 20. The signal transmitted to the speaker 20 from the controller 210 may be amplified by an amplifier at the speaker 20 end provided to the speaker 20.

Moreover, although, in the above embodiment, when vibration acts on the robot 200, the signal based on the vibration detected by the sensor part 230 is transmitted to the controller 210, the present disclosure is not limited to the above embodiment. The signal based on the detected vibration may be transmitted to the vibrating element, without going through the controller. That is, the signal based on the vibration detected by the sensor part 230 may be directly transmitted to the speaker 20, without being transmitted to the controller 210.

Second Embodiment

Next, a manipulation device 100a according to a second embodiment of the present disclosure is described. Note that description of a part configured similarly to the first embodiment is omitted, but only a different part is described.

In the first embodiment, the speaker 20 is used as the vibrating element which generates at the manipulation device 100 end, vibration to be transmitted to the operator. In the second embodiment, a transducer 21 is used as the vibrating element which generates at the manipulation device 100a end, the vibration to be transmitted to the operator. The transducer 21 used in the second embodiment is a transducer of a type which converts an electrical signal into vibration.

Figure 7:
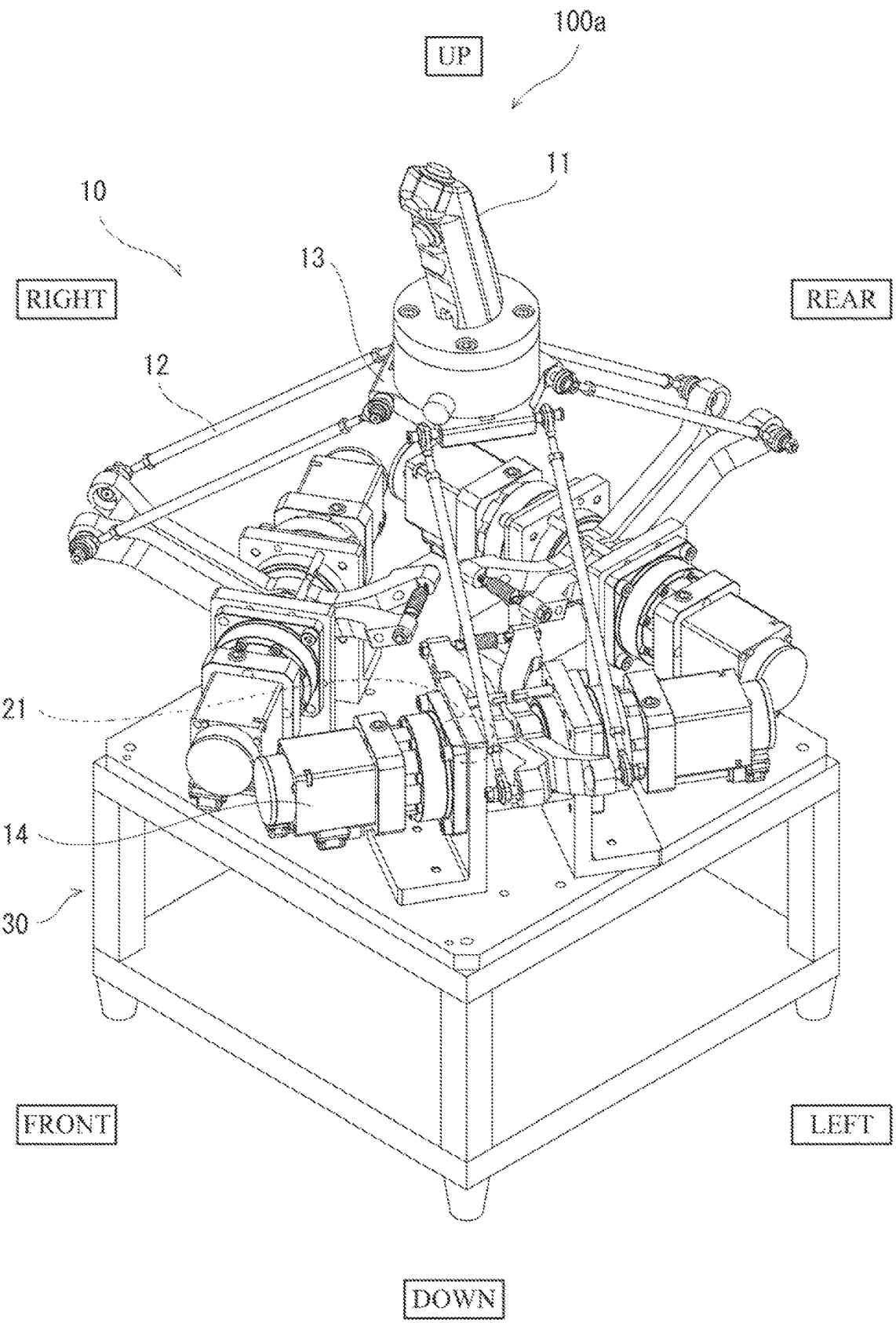
FIG. 7 is a perspective view of a manipulation device according to a second embodiment of the present disclosure.

A perspective view of the manipulation device 100a in the second embodiment is illustrated in FIG. 7. In the second embodiment, the transducer 21 is disposed in the surface of the support table 30 to which the input part 10 is attached.

Figure 8A:
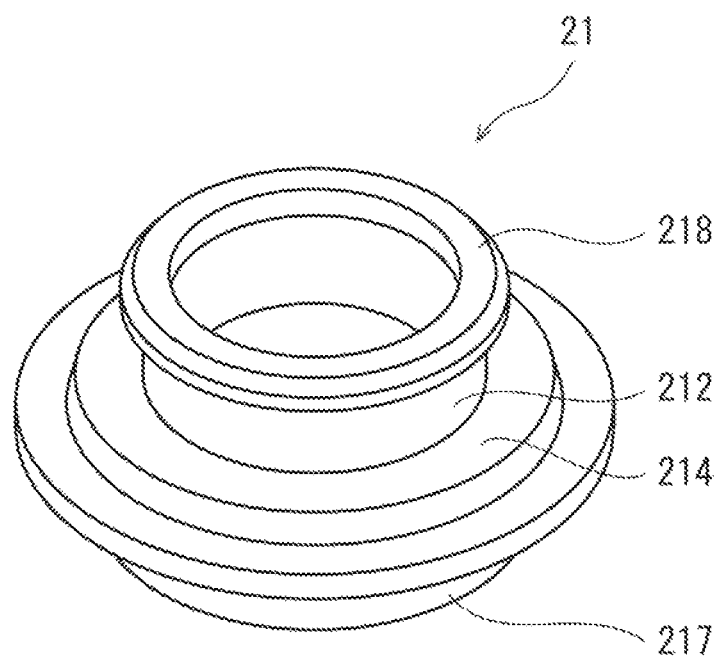
FIG. 8(a) is a perspective view of a transducer of FIG. 7.
Figure 8B:
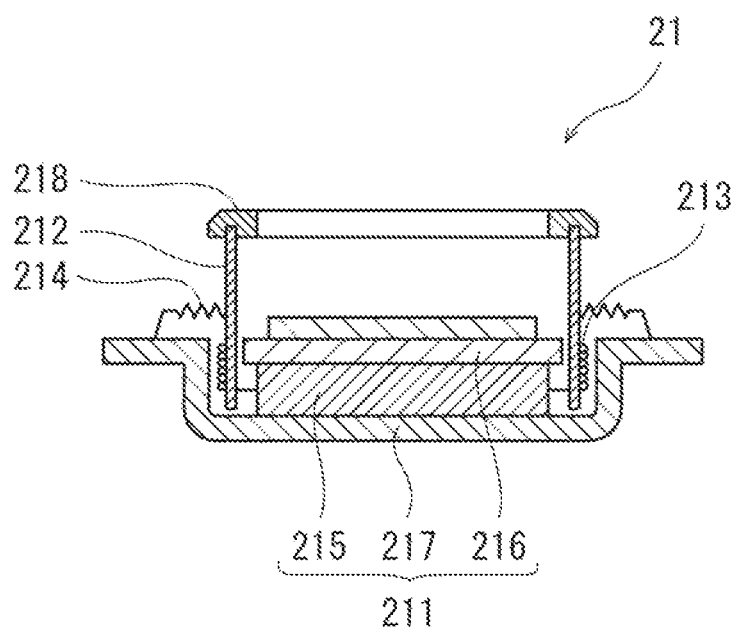
FIG. 8(b) is a cross-sectional view of the transducer of FIG. 7.

A configuration of the transducer 21 is described. A perspective view of the transducer 21 is illustrated in FIG. 8(*a*), and a cross-sectional view of the transducer 21 is illustrated in FIG. 8(*b*).

The transducer 21 has a magnetic circuit 211, a bobbin 212, a voice coil 213, and a suspension 214. The magnetic circuit 211 is mainly comprised of a magnet (a magnetic field generator) 215, an inner yoke 216, and an outer yoke 217. The bobbin 212 has a cylindrical shape. The suspension 214 connects the bobbin 212 with the outer yoke 217 so that the outer yoke 217 is disposed at a given position of the transducer 21. In a state where the bobbin 212 and the outer yoke 217 are connected through the suspension 214, the outer yoke 217 is configured to be movable in a separating direction and in an approaching direction from/to the bobbin 212. An annular member 218 is provided to a tip end of the bobbin 212. When the transducer 21 is attached to the manipulation device 100a, a tip-end part of the annular member 218 is attached to the surface of the support table 30 of the manipulation device 100a to which the input part 10 is attached. The transducer 21 is configured so that the voice coil 213 is generatable of vibration by applying electric current to the voice coil 213 inside a magnetic field of the magnet 215.

In the transducer 21 having such a structure, when the current flows into the voice coil 213, the outer yoke 217 vibrates by the voice coil 213 causing the vibration. At this time, the outer yoke 217 vibrates in the approaching direction and the separating direction to/from the bobbin 212. The vibration of the outer yoke 217 is transmitted to the manipulation device 100a through the annular member 218. Therefore, the vibration caused by the voice coil 213 is transmitted to the input part 10 of the manipulation device 100a through the bobbin 212 and the annular member 218. For example, by attaching such a transducer 21 to the manipulation device 100a in the same configuration as the speaker 20 illustrated in FIG. 1 and using the transducer 21, it becomes possible to transmit the vibration to the operator through the manipulation device 100a.

Generally, the transducer has a smaller configuration than the speaker. Therefore, in the second embodiment, the transducer 21 is disposed in a space of a gap between the motors 14 on the support table 30. It is difficult to dispose the speaker 20 in the space of the gap between the motors 14 if the speaker 20 has the size illustrated in FIGS. 3 and 4 in the first embodiment. However, if the small transducer 21 is used, it can be disposed in the space of the gap between the motors 14. Therefore, the transducer 21 is able to be attached to the position on the surface of the support table 30 to which the input part 10 is attached.

When vibration acts on the robot 200 while the operator operates the robot 200 by using the manipulation device 100a having this configuration, the vibration is detected by the sensor part 230, the signal based on the detected vibration is generated, and the signal is transmitted to the controller 210. When the controller 210 receives the signal from the sensor part 230, the signal is transmitted to the transducer 21 at the manipulation device 100a end. When the transducer 21 receives the signal, the transducer 21 generates the vibration according to the signal. At this time, the transducer 21 functions as the vibrating element which generates vibration.

Since the transducer 21 is attached to the surface of the support table 30 to which the input part 10 is attached, the transducer 21 can generate the vibration at a position closer to the grip part 11. Therefore, the vibration generated by the transducer 21 is more certainly recognized by the operator who grips the grip part 11.

Moreover, since the transducer 21 is attached to the surface of the support table 30 to which the input part 10 is attached, the vibration emitted at the backside of the transducer 21 is transmitted to the grip part 11 through the support table 30 and the arm parts 12. Moreover, the vibration emitted forward of the transducer 21 is transmitted to the grip part 11 through the arm parts 12 or is directly transmitted to the grip part 11. Therefore, the vibration emitted from the transducer 21 can be more efficiently transmitted to the operator.

Since the vibration which acted on the robot 200 can be recognized more certainly, the information on the robot 200 can be acquired more certainly. Moreover, since the configuration of the vibrating element can be reduced in the size, the configuration of the manipulation device 100a can be reduced in the size. Moreover, since the space of the gap between the motors 14 can be effectively used, the configuration of the manipulation device 100a can be further reduced in the size.

Note that, although in the second embodiment the transducer 21 is disposed at the surface of the support table 30 to which the input part 10 is attached, the present disclosure is not limited to the above embodiment. The transducer 21 may be attached to the surface of the supporting plate 31 of the support table 30 opposite the surface to which the input part 10 is attached, similar to the speaker 20 of the first embodiment.

Third Embodiment

Next, a manipulation device 100b according to a third embodiment of the present disclosure is described. Note that description of a part configured similarly to the first embodiment and the second embodiment is omitted, but only a different part is described.

In the third embodiment, a motor is used as the vibrating element which generates at the manipulation device 100b end, vibration to be transmitted to the operator.

Figure 9:
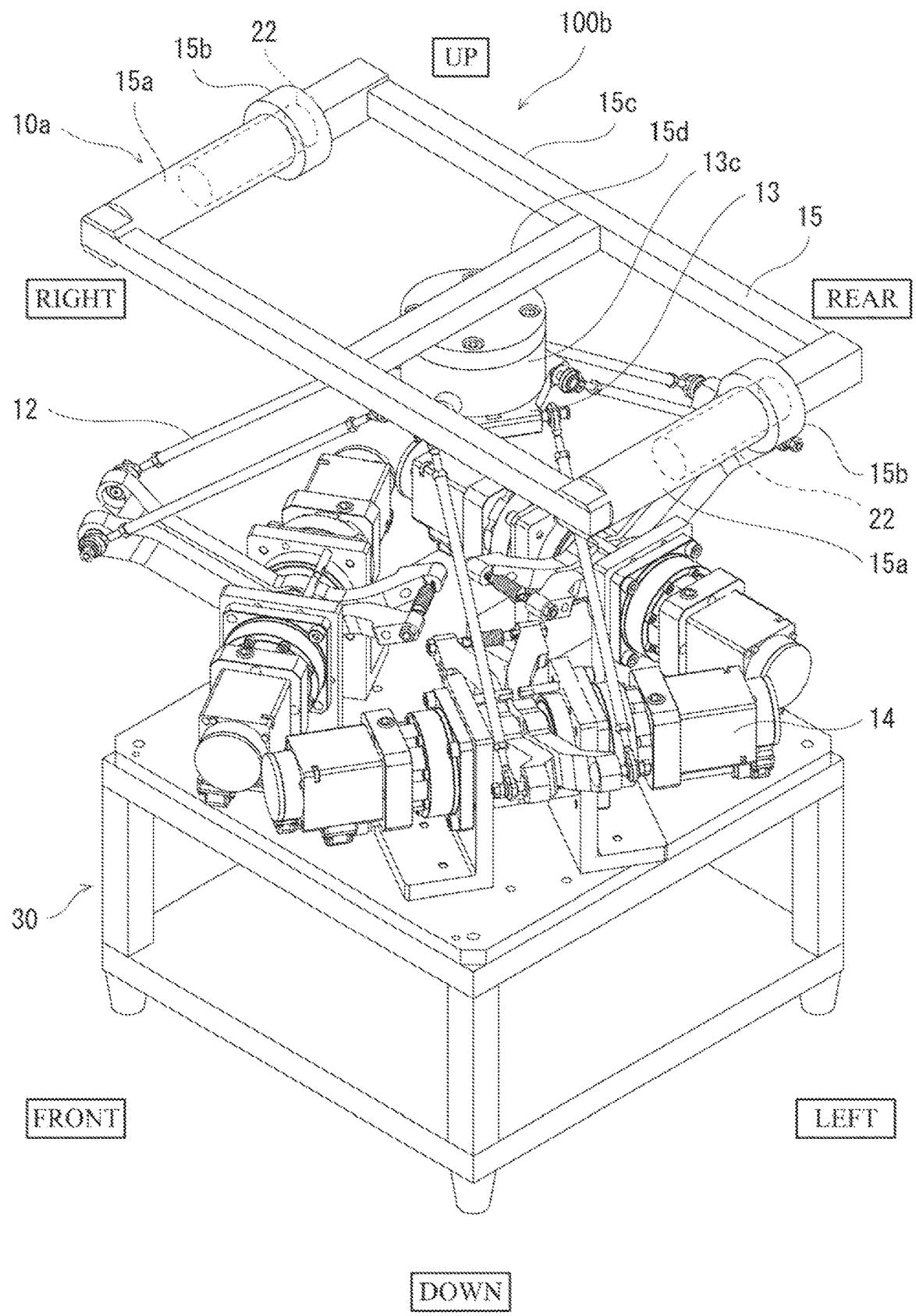
FIG. 9 is a perspective view of a manipulation device according to a third embodiment of the present disclosure.

A perspective view of the manipulation device 100b in the third embodiment is illustrated in FIG. 9. In the input part 10a of the third embodiment, a grip body 15 gripped by the operator is provided on the support part 13 in order to input the operational instruction into the robot 200.

The grip body 15 includes a grip part (grasp part) 15a gripped by the operator using hands. In this embodiment two grip parts 15a are provided so that the operator operates the manipulation device 100b with both hands and the grip parts 15a can be gripped by the respective hands. The grip body 15 can be leaned by changing the height between the two grip parts 15a. Therefore, the grip body 15 can be leaned easily and the operation of leaning the manipulating target can be performed easily. Thus, the operation of the manipulating target can be performed more easily by using the grip body 15. Therefore, the operability of the manipulation device 100b can be improved. Each grip part 15a is formed in a cylindrical shape. In this embodiment, the grip part 15a is attached at both ends of the grip body 15.

A diameter increased part 15b in which the diameter is formed larger than other parts is formed near a central part of the grip part 15a in a direction in which the center axis extends. The diameter increased part 15b is formed in a cylindrical shape having a larger diameter than other parts of the grip part 15a. In this embodiment, when the operator grips the grip part 15a, the diameter increased part 15b is provided to the grip part 15a so that the operator is easy to grip the grip part 15a by a hand Connecting members 15c which connect the grip parts 15a with each other are provided between the grip parts 15a provided at both ends. Two connecting members 15c are provided so as to connect both ends of the grip parts 15a with each other. A beam member 15d which connects the connecting member 15c with each other is provided near the center of the connecting member 15c between the grip parts 15a. The beam member 15d is attached to the connecting part 13c, and thereby, the grip body 15 is supported by the support part 13. The height between the two grip parts 15a can be changed by rotating the grip body 15 centering on the beam member 15d.

In this embodiment, a motor (first motor) 22 is disposed inside each grip part 15a.

When vibration acts on the robot 200 while the operator operates the robot 200 by using the manipulation device 100b configured in this way, the vibration is detected by the sensor part 230 attached to the robot 200. The vibration is detected by the sensor part 230, a signal based on detected vibration is generated, and the signal is transmitted to the controller 210. When the controller 210 receives the signal from the sensor part 230, the signal passes through a level conversion circuit.

When the signal is adjusted by the level conversion circuit, the signal according to the vibration to be generated is transmitted to the motor 22 at the manipulation device 100b end. When the motor 22 receives the signal, the motor 22 generates vibration according to the signal.

In this embodiment, since the motor 22 is disposed inside the diameter increased part 15b of the grip part 15a, vibration according to the vibration which acted on the robot 200 is generated by the motor 22 at a position closer to the operator's hand. Since the motor 22 generates the vibration at the position closer to the operator's hand, the operator can certainly sense the vibration. Therefore, the information on vibration which acted on the robot 200 can be certainly transmitted to the operator.

Moreover, since the motor 22 is provided inside the grip part 15a, the manipulation device 100b can be reduced in the size.

Moreover, in this embodiment, the motors 22 are disposed at the grip body 15 provided with the two grip parts 15a. However, the present disclosure is not limited to the above embodiment, and the motor 22 may be installed in the manipulation devices described in the first embodiment and the second embodiment. In that case, the motor 22 may be provided to the grip part 11, or may be provided at other positions. For example, similar to the speaker 20, the motor 22 may be provided at the position of the supporting plate 31 of the support table 30 on the surface opposite from the surface to which the input part 10 is provided, or may be provided at the position of the support table 30 on the surface same as the surface to which the input part 10 is provided, similar to the transducer 21.

Fourth Embodiment

Next, a manipulation device according to a fourth embodiment of the present disclosure is described. Note that description of a part configured similarly to the first embodiment to the third embodiment is omitted, but only a different part is described.

In the fourth embodiment, the motor (rotation part) 22 is disposed inside the grip part 15a, similar to the third embodiment. Moreover, in the fourth embodiment, an eccentric weight (eccentric member) is attached to a rotation shaft (output shaft) of the motor 22. The weight is provided inside the grip part 15a, and is attached to the rotation shaft of the motor 22 so as to be rotatable inside the grip part 15a. In this embodiment, the weight is accommodated inside the diameter increased part 15b of the grip part 15a. The weight is attached to the rotation shaft of the motor 22 so as to be rotatable inside the diameter increased part 15b.

When vibration is detected by the sensor part 230 while the operator operates the robot 200 by using the manipulation device having this configuration, a signal based on the detected vibration is generated and it is transmitted to the controller 210. When the controller 210 receives the signal from the sensor part 230, a signal is transmitted to the motor 22 at the manipulation device end. When the motor 22 receives the signal, the motor 22 generates vibration according to the signal. At this time, the motor 22 and the eccentric weight function as the vibrating element which generates vibration.

Since the eccentric weight is attached to the rotation shaft of the motor 22, a larger vibration can be generated by the rotation of the motor 22 when generating the vibration according to the vibration which acted on the robot 200. Therefore, when the vibration is generated by the motor 22, the operator can sense the generated vibration more certainly.

Moreover, in the fourth embodiment, the vibration is generated at the diameter increased part 15b of the grip part 15a. The operator senses the vibration in the palm which grips the diameter increased part 15b of the grip part 15a. Therefore, the generated vibration can be sensed more directly. Therefore, the information on the vibration which acted on the robot 200 can be transmitted to the operator more certainly.

Note that, in this embodiment, the motor 22 and the eccentric weight are disposed at the grip body 15. However, the present disclosure is not limited to the above embodiment, and the motor 22 and the eccentric weight may be installed in the manipulation devices described in the first embodiment and the second embodiment. In that case, the motor 22 and the eccentric weight may be provided to the grip part 11, or may be provided to other positions. For example, similar to the speaker 20, the motor 22 and the eccentric weight may be provided at the position on the surface of the supporting plate 31 of the support table 30 on the opposite side from the surface to which the input part 10 is provided, or may be provided at the position on the same surface of the support table 30 as the surface to which the input part 10 is provided, similar to the transducer 21.

Moreover, although in the above embodiment the eccentric weight is attached to the motor, the present disclosure is not limited to the above embodiment. The eccentric weight may be attached to an AC motor.

Fifth Embodiment

Next, a manipulation device according to a fifth embodiment of the present disclosure is described. Note that description of a part configured similarly to the first embodiment to the fourth embodiment is omitted, but only a different part is described.

In the third embodiment and the fourth embodiment, the motor 22 used as the vibrating element which generates the vibration at the manipulation device end is attached inside the grip part 15a of the grip body 15. In the input part 10 of the manipulation devices in the first embodiment to the fourth embodiment, the fifth embodiment is configured so that the motor 14 disposed on the support table 30 generates vibration at the manipulation device end. By the rotation of the motor 14, vibration according to the vibration which acted on the robot 200 is generated at the manipulation device end. At this time, the motor (second motor) 14 functions as the vibrating element which generates vibration.

In this embodiment, the motor 14 causes torque for moving the arm part 12 to act on the arm part 12 after the grip body 15 is moved so that the grip body 15 is returned to a given position. Therefore, the motor 14 which causes the torque for moving the arm part 12 to act on the arm part 12 functions as the vibrating element which generates vibration.

Thus, the motor 14 which constitutes the input part 10 functions as the vibrating element which generates vibration at the manipulation device end. Since the motor 14 functions as the vibrating element which generates vibration at the manipulation device end, it is not necessary to provide a new configuration in order to generate the vibration at the manipulation device end. Therefore, the configuration of the manipulation device can be simplified. Since the configuration of the manipulation device 100d can be simplified, the manufacturing cost of the manipulation device can be kept low. Moreover, the manipulation device can be reduced in the size.

Note that, in the above embodiment, the motor 14 causes the torque for moving the arm part 12 to act on the arm part 12 so that the grip body 15 is returned to the given position. However, the present disclosure is not limited to the above embodiment, and the motor 14 may be to present the operator a force sense of load when the load is applied to the manipulating target. Moreover, the motor 14 may be to support the grip part 11 and the arm part 12. Moreover, the motor 14 may have a plurality of functions among the functions described above.

Moreover, in this embodiment, the motor 14 functions as the vibrating element which generates vibration in the manipulation device using the grip body 15. However, the present disclosure is not limited to the above embodiment, and the motor 14 which functions as the vibrating element may be installed in the manipulation devices described in the first embodiment and the second embodiment. That is, the motor 14 which causes the torque for moving the arm part 12 to act on the arm part 12 so that the grip part 11 is returned to the given original position after the grip part 11 is moved may be configured to function as the vibrating element.

Sixth Embodiment

Next, a manipulation device according to a sixth embodiment of the present disclosure is described. Note that description of a part configured similarly to the first embodiment to the fifth embodiment is omitted, but only a different part is described.

In the sixth embodiment, the controller 210 has a filter which passes only a particular frequency band of the signal transmitted from the sensor part 230. In this embodiment, the filter passes only a frequency band exceeding a threshold for a sound pressure level of the signal.

A manipulation system for operating the robot 200 by using the manipulation device of the sixth embodiment is described.

When vibration acts on the robot 200, the vibration is detected by the sensor part 320 of the robot 200. A signal of the vibration detected by the sensor part 230 is transmitted to the controller 210. That is, the sensor part 230 detects the vibration and transmits the signal based on the detected vibration to the controller 210. The controller 210 receives the signal transmitted from the sensor part 230.

The controller 210 receives the signal from the sensor part 230 at the robot 200 end, and transmits the received signal to the vibrating element at the manipulation device end. At this time, the controller 210 filters the signal received from the sensor part 230. Here, the signal is filtered before transmitting the signal for generating the vibration at the manipulation device end to the vibrating element.

When the controller 210 filters the signal received from the sensor part 230, only the particular frequency band of the signal transmitted from the sensor part 230, which is to be sensed by the operator, can be passed. Further, the filter passes only the frequency band of the signal transmitted from the sensor part 230 exceeding the threshold of the sound pressure level.

Therefore, only a necessary signal of the signal received from the sensor part 230 at the robot 200 end is extracted. That is, surrounding noise which is not related to the operation can be removed. Thus, the controller 210 has the filter for extracting only a given portion of the signal transmitted from the sensor part 230.

The filtered signal is transmitted to the vibrating element which generates the vibration at the manipulation device end. Thus, only the frequency band of the sound pressure level of the signal transmitted from the sensor part 230 which exceeds the threshold is transmitted to the vibrating element. The vibrating element vibrates based on the extracted signal. Therefore, only the vibration component extracted from the vibration generated at the robot 200 end can be transmitted to the manipulation device end.

The vibrating element generates vibration based on the received signal, and transmits the vibration based on the vibration detected by the sensor part 230 to the operator of the manipulation device.

Figure 10A:
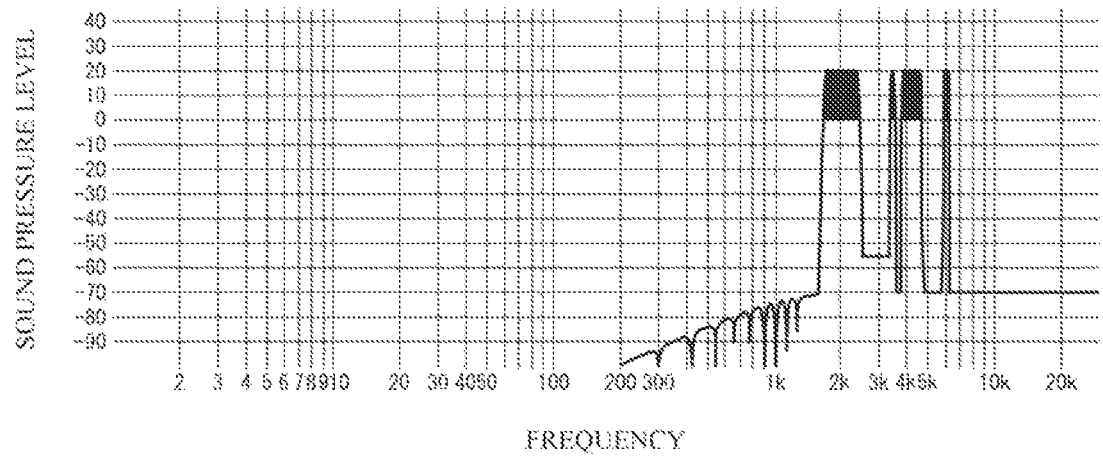
FIGS. 10(a) and 10(b) are graphs illustrating signals of vibration extracted from signals of vibration transmitted to a vibrating element of a manipulation device according to a sixth embodiment of the present disclosure.
Figure 10B:
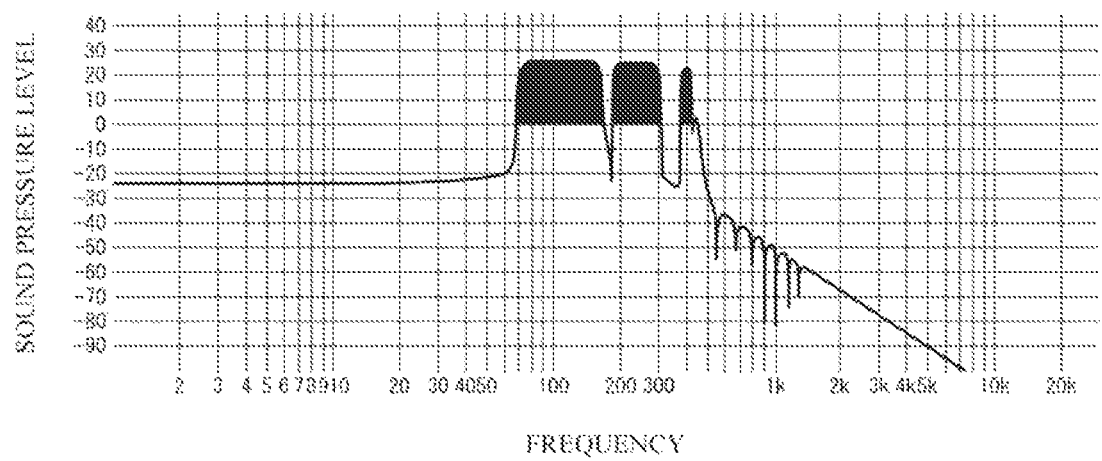

Graphs of the frequency portion of the signal which is extracted from the signal based on the vibration generated at the robot 200 end by using the filter, and is transmitted to the vibrating element is illustrated in FIGS. 10(a) and 10(b). In the graphs illustrated in FIGS. 10(a) and 10(b), the vertical axis indicates the sound pressure level (dB), and the horizontal axis indicates the frequency (Hz).

In the graphs illustrated in FIGS. 10(a) and 10(b), the vibration of the extracted frequency portion is painted in black. In the graph illustrated in FIG. 10(a), only the portion having the portion where the sound pressure level is zero or more is extracted. Moreover, similar in the graph illustrated in FIG. 10(b), only the frequency band having the component where the sound pressure level is zero or more is extracted.

As illustrated in FIGS. 10(a) and 10(b), only the frequency component having the sound pressure level more than the certain value (i.e., the sound pressure level is zero or more) is extracted, and only the extracted frequency component is transmitted to the vibrating element. The signal of only the extracted frequency component is transmitted to the vibrating element, and the vibrating element vibrates based on the signal of only the extracted frequency component.

In this embodiment, for example, since only the extracted vibration can be transmitted to the operator, only the vibration having the sound pressure level exceeding the threshold among the vibration which acted on the robot 200 can be exaggerated and transmitted to the operator. Therefore, the information on the robot 200 can be transmitted to the operator more certainly.

For example, if the robot 200 is installed in a factory, various sounds are made in the factory. Therefore, the sensor part 230 attached to the robot 200 may also collect vibration other than the vibration which acted on the robot 200. Since this vibration is transmitted to the operator, the sound which is not related to the robot 200 is also transmitted to the operator, and therefore, the operator may be unable to correctly grasp the information on the environment around the robot 200.

Therefore, in this embodiment, only the extracted signal is transmitted to the vibrating element by using the filter. Therefore, the operator can grasp the information on the environment around the robot 200 more correctly.

Note that, in the above embodiment, only the frequency band of the signal transmitted from the sensor part 230 exceeding the threshold of the sound pressure level is transmitted to the operator by using the filter. Thus, only the signal extracted from the signal received from the sensor part 230 at the robot 200 end is transmitted to the operator. However, the present disclosure is not limited to this configuration, and only the necessary signal may be extracted from the signal received from the sensor part 230 at the robot 200 end by using other methods.

For example, a sound concentrating microphone may be installed around the robot 200, separately from the sensor part 230. Thus, signal of sound around the robot 200 is generated, which is detected by the sound concentrating microphone provided separately from the sensor part 230. The signal from the sensor part 230 is compared with the signal from the separate sound concentrating microphone, and a signal component which is the same as the signal of the sound detected by the sound concentrating microphone provided separately from the sensor part 230 is removed from the signal received from the sensor part 230. Therefore, the sound caused around the robot 200 is cancelled out. Therefore, the controller 210 can cancel out the sound caused around the robot 200, and extract only the necessary sound.

Other Embodiments

Note that, although in the above embodiments the speaker, the direct-current motor, the motor for generating the electrical signal, etc. are used as the vibrating element which generates vibration at the manipulation device end, the present disclosure is not limited to the above embodiments.

The vibrating element may be other types, as long as it can generate, when vibration acts on the manipulating target of the manipulation device, vibration based on the vibration at the manipulation device end.

Moreover, although in the above embodiments the robot is used as the manipulating target of the manipulation device, the present disclosure is not limited to the above embodiments. The manipulating target may be other than the robot. The manipulating target may be other things, as long as it is manipulated by the manipulation device.

DESCRIPTION OF REFERENCE CHARACTERS

10 Input Part
20 Speaker
100 Manipulation Device

What is claimed is:
1. A manipulation device, comprising:
an input part configured to receive an input of an operational instruction by an operator in order to operate a manipulating target; and
a vibrating element configured to receive a signal based on vibration detected at the manipulating target and generate vibration based on the received signal,
wherein the vibration generated by the vibrating element is directly mechanically transmitted to the operator through at least a part of the input part,
wherein the input part includes (a) a grip part configured to be gripped by the operator when the operational instruction is inputted, (b) a plurality of arms that movably support the grip part, and (c) a plurality of motors connected to respective ones of the plurality of arms and configured to support the grip part, the plurality of motors configured to provide a force by giving resistance to the operator when the manipulating target contacts an object, and the plurality of motors are disposed vertically between the vibrating element and the grip part,
wherein the vibrating element is attached to the grip part,
wherein the vibrating element is attached to a supporting plate of a support table, on an opposite side from a surface of the supporting plate to which the input part is attached, and
wherein the vibrating element and the plurality of motors contact the supporting plate in a manner whereby vibration generated from the vibrating element can be transmitted to the grip part via the plurality of motors and the plurality of arms.
2. The manipulation device of claim 1, wherein the input part includes a grip body having two grip parts.

3. A manipulation system, comprising:

a manipulating target having a sensor part configured to detect vibration and transmit a signal based on the detected vibration; and a manipulation device having an input part configured to receive an input of an operational instruction by an operator in order to operate the manipulating target, and a vibrating element configured to receive a signal from the sensor part and generate vibration based on the received signal, the vibrating element being a first motor, wherein the vibration generated by the vibrating element is directly mechanically transmitted to the operator through at least a part of the input part, wherein the input part includes (a) a grip part configured to be gripped by the operator when the operational instruction is inputted, (b) a plurality of arms that movably support the grip part, and (c) a plurality of motors connected to respective ones of the plurality of arms and configured to support the grip part, the plurality of motors configured to provide a force by giving resistance to the operator when the manipulating target contacts an object, and the plurality of motors are disposed vertically between the vibrating element and the grip part, wherein the vibrating element is attached to the grip part, wherein the vibrating element is attached to a supporting plate of a support table, on an opposite side from a surface of the supporting plate to which the input part is attached, and wherein the vibrating element and the plurality of motors contact the supporting plate in a manner whereby vibration generated from the vibrating element can be transmitted to the grip part via the plurality of motors and the plurality of arms.

4. The manipulation system of claim 3, comprising a controller configured to receive the signal from the sensor part and transmit the received signal to the vibrating element, wherein the controller has a filter configured to pass only a particular frequency band of the signal transmitted from the sensor part.

5. The manipulation system of claim 4, wherein the particular frequency band is a frequency band exceeding a threshold of a sound pressure level.

\* \* \* \* \*